(12) United States Patent
Shimizu et al.

(10) Patent No.: US 8,973,361 B2
(45) Date of Patent: Mar. 10, 2015

(54) SEAL AIR SUPPLY SYSTEM AND EXHAUST GAS TURBINE TURBOCHARGER USING SEAL AIR SUPPLY SYSTEM

(75) Inventors: Yuuichi Shimizu, Tokyo (JP); Hajime Suzuki, Tokyo (JP); Hideki Nishio, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 89 days.

(21) Appl. No.: 13/695,582

(22) PCT Filed: Jun. 16, 2011

(86) PCT No.: PCT/JP2011/063823
§ 371 (c)(1),
(2), (4) Date: Dec. 6, 2012

(87) PCT Pub. No.: WO2012/002161
PCT Pub. Date: Jan. 5, 2012

(65) Prior Publication Data
US 2013/0101401 A1 Apr. 25, 2013

(30) Foreign Application Priority Data

Jul. 2, 2010 (JP) ................................. 2010-152374

(51) Int. Cl.
*F02B 33/44* (2006.01)
*F02B 33/00* (2006.01)
(Continued)

(52) U.S. Cl.
CPC ................ *F04D 29/00* (2013.01); *F01D 11/04* (2013.01); *F02B 37/001* (2013.01);
(Continued)

(58) Field of Classification Search
CPC ............ F01D 11/04; F02C 7/28; F04D 29/08
USPC .............. 60/598, 605.1, 607, 612; 123/559.1, 123/612; 415/175–176, 110–113
See application file for complete search history.

(56) References Cited

U.S. PATENT DOCUMENTS 4,207,035 A * 6/1980 Perr et al. ...................... 417/407
4,472,107 A * 9/1984 Chang et al. .................. 415/104
(Continued)

FOREIGN PATENT DOCUMENTS

CN 101160461 A 4/2008
CN 101310098 A 11/2008
(Continued)

OTHER PUBLICATIONS

Japanese Notice of Allowance dated Dec. 3, 2013, issued in corresponding Japanese Patent Application No. 2010-152374, w/ English translation (6 pages).

(Continued)

*Primary Examiner* — Thomas Denion
*Assistant Examiner* — Jessica Kebea
(74) *Attorney, Agent, or Firm* — Westerman, Hattori, Daniels & Adrian, LLP

(57) ABSTRACT

Provided is a seal air supply system including: a seal air compressor 73 provided separately from an exhaust gas turbine turbocharger 27 to generate compressed air; a seal air supply passage 77 through which the compressed air is supplied to a seal air supply part 79 as seal air of the exhaust gas turbine turbocharger 27; and a surplus air inlet passage 81 bifurcating from the seal air supply passage 77 and guiding surplus air of the seal air to an outlet side of an intake gas compressor 27a of the exhaust gas turbine turbocharger.

9 Claims, 5 Drawing Sheets

(51) Int. Cl.
| | |
|---|---|
| *F01D 11/00* | (2006.01) |
| *F04D 29/04* | (2006.01) |
| *F04D 29/00* | (2006.01) |
| *F01D 11/04* | (2006.01) |
| *F02B 37/00* | (2006.01) |
| *F02B 37/007* | (2006.01) |
| *F02B 37/16* | (2006.01) |
| *F02B 39/16* | (2006.01) |
| *F02C 6/12* | (2006.01) |
| *F02C 7/28* | (2006.01) |
| *F02M 21/02* | (2006.01) |

(52) U.S. Cl.
CPC .............. *F02B 37/007* (2013.01); *F02B 37/16* (2013.01); *F02B 39/16* (2013.01); *F02C 6/12* (2013.01); *F02C 7/28* (2013.01); *F02M 21/02* (2013.01); *Y02T 10/144* (2013.01); *F05D 2220/40* (2013.01)
USPC ................ 60/611; 60/598; 60/605.1; 60/612; 123/559.1; 123/562; 415/110; 415/111; 415/112; 415/175; 415/176

(56) References Cited

U.S. PATENT DOCUMENTS

| | | | | |
|---|---|---|---|---|
| 4,599,862 | A * | 7/1986 | Bergeron | 60/605.3 |
| 4,903,489 | A * | 2/1990 | Ruetz | 60/612 |
| 5,076,765 | A * | 12/1991 | Yagi et al. | 417/407 |
| 6,062,026 | A | 5/2000 | Woollenweber et al. | |
| 6,318,086 | B1 | 11/2001 | Laustela et al. | |
| 8,100,636 | B2 * | 1/2012 | Schmitt | 415/116 |
| 8,172,503 | B2 * | 5/2012 | Sandstede et al. | 415/110 |
| 8,474,433 | B2 * | 7/2013 | French | 123/320 |
| 2004/0112054 | A1 * | 6/2004 | Larsson et al. | 60/611 |
| 2008/0031750 | A1 * | 2/2008 | Gomilar et al. | 417/409 |
| 2009/0324381 | A1 * | 12/2009 | Arnold | 415/1 |
| 2010/0126170 | A1 | 5/2010 | Nishio et al. | |
| 2012/0328418 | A1 * | 12/2012 | Yang et al. | 415/170.1 |
| 2013/0022445 | A1 * | 1/2013 | Carlill et al. | 415/1 |

FOREIGN PATENT DOCUMENTS

| | | |
|---|---|---|
| CN | 101451481 A | 6/2009 |
| DE | 10 2007 019 060 A1 | 11/2008 |
| JP | 04-066325 U | 6/1992 |
| JP | 06-346749 A | 12/1994 |
| JP | 11-117753 A | 4/1998 |
| JP | 2001-020748 A | 1/2001 |
| JP | 4108061 B2 | 6/2008 |
| JP | 2009-144626 A | 7/2009 |

OTHER PUBLICATIONS

Translation of the International Preliminary Report on Patentability (PCT/ISA/237) (4 pages), (PCT/IB/373) (1 page) of International Application No. PCT/JP2011/063823 mailed Feb. 21, 2013 (Form PCT/IB/338) (1 page), (Form PCT/IB/326) (1 page).
International Search Report of PCT/JP2011/063823, mailing date Aug. 9, 2011.
Korean Notice of Allowance dated Mar. 13, 2014, issued in Korean application No. 10-2012-7028498, w/ English translation (4 pages).
Chinese Office Action dated Mar. 27, 2014, issued in corresponding Chinese Patent Application No. 201180022001.0, w/English translation (16 pages).

* cited by examiner

PRIOR ART

SEAL AIR SUPPLY SYSTEM AND EXHAUST GAS TURBINE TURBOCHARGER USING SEAL AIR SUPPLY SYSTEM

TECHNICAL FIELD

The present invention relates to a seal air supply system and an exhaust gas turbine turbocharger using this seal air supply system. More particularly, the invention relates to a seal air supply system for an exhaust gas turbine turbocharger in a gas engine in which a pre-mixed gas mixture of air and part or all of fuel gas is supplied to cylinders via the exhaust gas turbine turbocharger.

BACKGROUND ART

It is a conventional practice in an engine equipped with an exhaust gas turbine turbocharger to extract part of intake air supplied to the intake air compressor of the exhaust gas turbine turbocharger, or part of intake air compressed by the intake air compressor, and to feed this air to a backside space of the exhaust gas turbine or bearing parts, etc (hereinafter referred to as "seal air"), for the purposes of preventing ingress of exhaust gas from the engine into the intake side of the turbocharger, balancing the thrust from the exhaust gas turbine of the turbocharger, and cooling the backside of the intake air compressor and the exhaust gas turbine. The seal air is released to atmosphere after having served the purposes.

For example, Patent Document 1 (Japanese Patent Application Laid-open No. H6-346749) discloses a configuration shown in FIG. 5, in which low-temperature air on the secondary side of a scavenging chamber 03 for a main engine, after having been compressed by a turbocharger 01 and cooled thereafter by a cooler 02, is supplied to a side face of a turbine disc provided on the turbine side 04 of the turbocharger 01 as seal air, so as to cool the turbine blades and the turbine disc parts in addition to the original functions (of balancing the thrust and providing seals for oil and gas).

Patent Document 2 (Japanese Patent Application Laid-open No. H11-117753) discloses, too, a configuration in which compressed air from the compressor of a turbocharger is directed through a seal air passage to the back of the turbine to provide a balance for the rotor shaft, to prevent ingress of exhaust gas, and to provide a seal for preventing leakage of lubricating oil, and in which a valve is attached midway of the seal air passage to automatically open this passage when the air pressure on the compressor outlet side is higher than the pressure in the backside space of the turbine.

Meanwhile, for a gas engine that uses a low energy gas such as coal mine methane gas as fuel gas, a pre-mixing intake system is known, for example as shown in Patent Document 3 (Japanese Patent Application Laid-open No. 2009-144626), in which part or all of fuel gas is pre-mixed to intake air before the turbocharger, so that this gas mixture is compressed by the turbocharger and fed into the cylinders.

Patent Document 1: Japanese Patent Application Laid-open No. H6-346749
Patent Document 2: Japanese Patent Application Laid-open No. H11-117753
Patent Document 3: Japanese Patent Application Laid-open No. 2009-144626

However, in a gas engine with a pre-mixing intake system in which part or all of fuel gas is pre-mixed to air before the turbocharger as disclosed in Patent Document 3, and in particular, in a gas engine where fuel gas such as methane is pre-mixed to air, if the intake gas charged to the engine is utilized as seal air and partly supplied to the turbocharger as shown in Patent Documents 1 and 2, there is a possibility that methane gas may contact high-temperature parts or portions inside the turbocharger, since the intake gas contains methane.

Moreover, releasing the seal air to atmosphere after it has been supplied to the backside space of the turbine and bearing, etc, means releasing part of the fuel gas to atmosphere, which causes an adverse effect on the air environment, as methane gas has a significant greenhouse effect, and which may also deteriorate the fuel consumption efficiency.

DISCLOSURE OF THE INVENTION

The present invention was made in view of these problems, its object being, in a seal air supply system for an exhaust gas turbine turbocharger of a gas engine in which a mixture of air and part or all of fuel gas pre-mixed upstream of the exhaust gas turbine turbocharger is supplied as intake gas via the turbocharger, to prevent the intake gas mixture from directly contacting high-temperature parts of the exhaust gas turbine turbocharger, and to reduce emission of the intake gas mixture to atmosphere to prevent air pollution.

To solve the problems, the invention provides a seal air supply system for an exhaust gas turbine turbocharger in a gas engine, in which a mixture of air and part or all of fuel gas pre-mixed upstream of the exhaust gas turbine turbocharger is supplied as intake gas to a combustion chamber through the exhaust gas turbine turbocharger, the seal air supply system including: a seal air compressor provided separately from the exhaust gas turbine turbocharger; a seal air supply passage guiding compressed air generated by the seal air compressor to a seal air supply part of the exhaust gas turbine turbocharger as seal air of the exhaust gas turbine turbocharger; and a surplus air inlet passage bifurcating from the seal air supply passage and guiding surplus air of the seal air fed to the seal air supply part to a compressor outlet side of the exhaust gas turbine turbocharger.

According to this invention, compressed air from a seal air compressor provided separately from the exhaust gas turbine turbocharger is supplied to a seal air supply part through a seal air supply passage as seal air for the exhaust gas turbine turbocharger of the gas engine that uses methane and the like as fuel gas. As the intake gas mixture containing a pre-mixed fuel gas such as methane is not used as seal air, there is no possibility that the intake gas mixture directly contacts high-temperature parts of the exhaust gas turbine turbocharger.

Since it is air that is supplied to the seal air supply part, it does not have a serious greenhouse effect as methane even if released to atmosphere, so that air pollution is prevented.

Moreover, the system includes a surplus air inlet passage, which bifurcates from the seal air supply passage that supplies seal air generated by the seal air compressor to the seal air supply part, and guides surplus air of the seal air to a compressor outlet side of the exhaust gas turbine turbocharger. Therefore, if there is any surplus of compressed air generated by the seal air compressor in excess of the amount consumed as seal air, this surplus is added to the air discharged from the exhaust gas turbine turbocharger, so that the turbocharger can have higher efficiency.

In the present invention, preferably, the system may include a seal air release passage that returns the seal air that has flowed through the seal air supply part to a compressor inlet side of the exhaust gas turbine.

Thus the seal air supplied to the seal air supply part is directed to the compressor inlet side of the exhaust gas turbine through the seal air release passage, after it has served its purposes of preventing ingress of the exhaust gas from the engine into the intake side of the exhaust gas turbine turbocharger, balancing the thrust from the exhaust gas turbine, and cooling the backsides of the intake gas compressor and the exhaust gas turbine, so that the exhaust gas turbine turbocharger can have higher efficiency. As the seal air is not released to atmosphere, the adverse greenhouse effect on the air environment is prevented.

In the present invention, preferably, the seal air compressor may be an exhaust gas turbine compressor provided in parallel with the exhaust gas turbine turbocharger relative to a flow of exhaust gas in the gas engine and driven by the exhaust gas.

Since the seal air compressor is installed as an exhaust gas turbine compressor for producing seal air in parallel with the exhaust gas turbine turbocharger relative to a flow of exhaust gas in the gas engine only for generating seal air, it can be a compressor of a smaller capacity than the main exhaust gas turbine turbocharger.

Exhaust gas from the gas engine drives both of the exhaust gas turbine turbocharger and the exhaust gas turbine compressor for producing seal air. Thus generation of seal air is linked to the operating state of the gas engine, so that there is no risk that the gas engine continues running even though the supply of seal air to the exhaust gas turbine turbocharger has stopped, leading to seal failure, an imbalance of thrust, or cooling failure in, and consequent performance deterioration of, the exhaust gas turbine turbocharger, which may result in deterioration of engine performance. Reliability of the seal air supply system is therefore improved.

In the present invention, preferably, the seal air compressor may be driven by a drive unit provided separately from the gas engine. The drive unit may be any drive source such as an electric motor or a separate engine.

As the seal air compressor is driven by a drive unit separate from the gas engine so that compressed air it produces can be supplied to the exhaust gas turbine turbocharger as seal air, the seal air supply system can be installed simply at low cost without changing the configuration of the engine for installation of the seal air compressor.

In the present invention, preferably, a check valve that allows the seal air to flow only toward the compressor outlet side of the exhaust gas turbine turbocharger may be provided in the surplus air inlet passage.

As the high-pressure intake gas mixture on the compressor outlet side of the exhaust gas turbine turbocharger is stopped from flowing reversely into the surplus air inlet passage, a surplus of compressed air generated by the seal air compressor can be directed to the outlet side of the exhaust gas turbine turbocharger only when there is a surplus of compressed air in excess of the amount consumed as seal air, and when the pressure is higher than that on the outlet side of the turbocharger. Surplus air is thus guided to the intake gas mixture on the compressor outlet side of the exhaust gas turbine turbocharger reliably.

According to the present invention, the system includes a seal air compressor provided separately from the exhaust gas turbine turbocharger, a seal air supply passage for guiding compressed air generated by the seal air compressor to a seal air supply part of the exhaust gas turbine turbocharger as seal air of the exhaust gas turbine turbocharger, and a surplus air inlet passage bifurcating from the seal air supply passage and guiding surplus air of the seal air fed to the seal air supply part to a compressor outlet side of the exhaust gas turbine turbocharger. As the intake gas mixture containing a pre-mixed fuel gas such as methane is not used as seal air, there is no possibility that the intake gas mixture directly contacts high-temperature parts of the exhaust gas turbine turbocharger.

Since it is air that is supplied to the seal air supply part, it does not have a serious greenhouse effect as methane even if released to atmosphere, so that air pollution is prevented.

BEST MODE FOR CARRYING OUT THE INVENTION

The illustrated embodiments of the present invention will be hereinafter described in detail. It should be noted that, unless otherwise particularly specified, the sizes, materials, shapes, and relative arrangement or the like of constituent components described in these embodiments are not intended to limit the scope of this invention.

The overall configuration of the gas engine to which the seal air supply system for the exhaust gas turbine turbocharger of the present invention is applied will be described with reference to FIG. 1.

One embodiment will be described, in which the gas engine 1 is a power generating gas engine with a turbocharger, which is installed near a coal mine, and uses methane gas emitted from the coal mine as fuel gas and intake gas.

Coal mines emit two types of methane gas: CMM (Coal Mine Methane) gas (with a concentration of about 30 to 50 wt %) existing in and recovered from coal seams through degassing bore holes using vacuum pumps for safety reasons, and VAM (Ventilation Air Methane) gas (with a concentration of 0.3 to 0.7 wt %) released through venting from the mine tunnels and the coal face.

In this embodiment, the coal mine methane CMM is supplied to a gas supply pipe 3 and used as fuel gas, while a mixture of atmospheric air and the ventilation air methane VAM, or air alone without VAM, is supplied to an air inlet pipe 5.

While this embodiment will be described with respect to the gas engine 1 installed near a coal mine, the invention is not limited to this. For example, biomass gas or the like may be used as fuel gas, and landfill gas produced in a landfill or other gases having a methane concentration lower than the explosion limit may be used as fuel gas to be pre-mixed with air.

Figure 1:
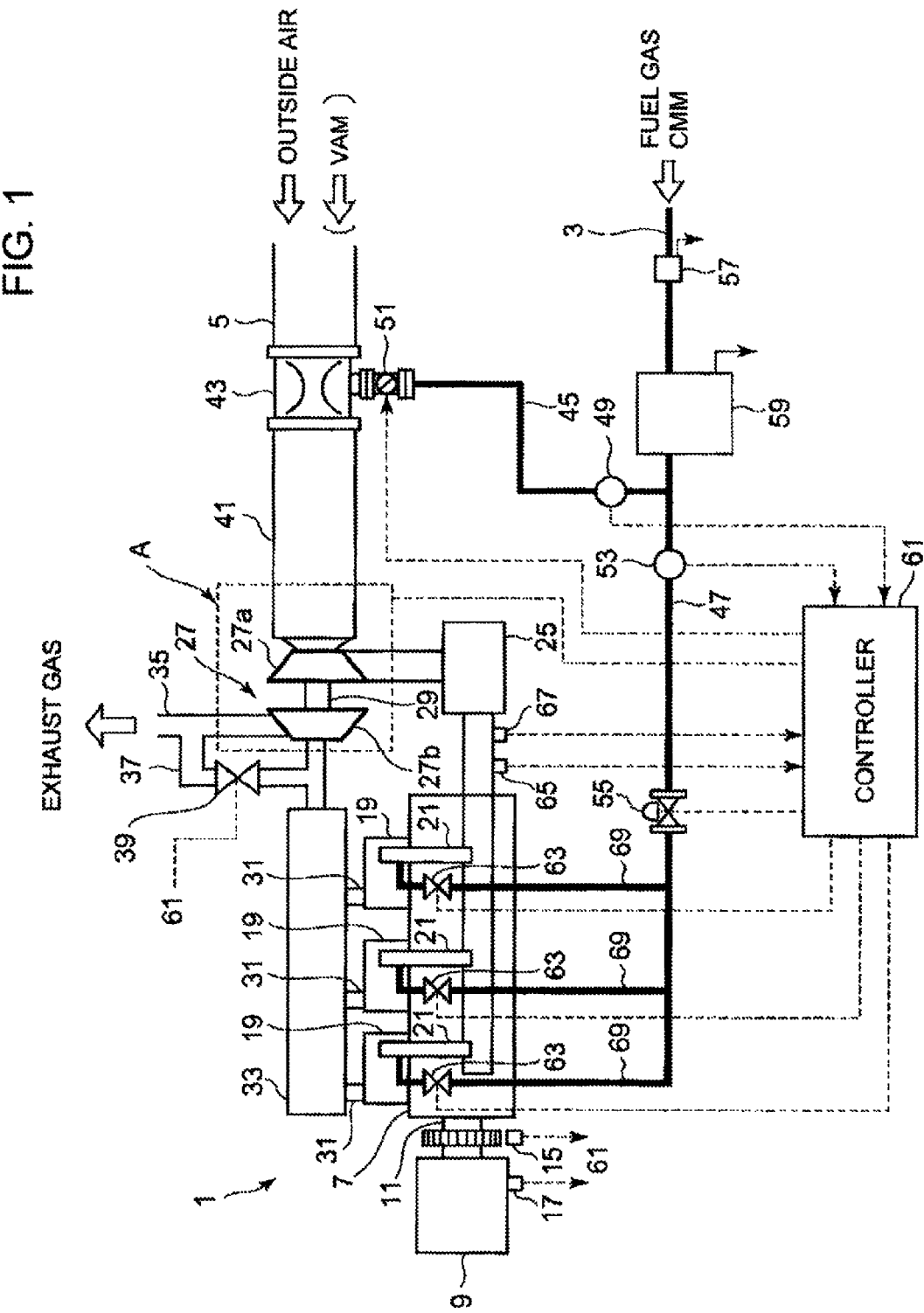
FIG. 1 is an overall configuration diagram illustrating a gas engine of the present invention.

In FIG. 1, the power generating gas engine 1 includes an engine body 7 having a plurality of (three in FIG. 1) combustion cylinders, inside which combustion chambers are formed, and a generator 9 coupled to an output shaft 11 of the engine body 7. A fly wheel 13 is attached to the output shaft 11. An engine rpm sensor 15 is provided on the outer side of the fly wheel 13. A load sensor 17 detects the load of the generator 9 to measure the engine load.

Intake branch pipes 21 are connected to the respective cylinder heads 19 of the gas engine 1. These intake branch pipes 21 are connected to an intake pipe 23, which is connected to an intercooler 25 for cooling the intake gas, and further to an intake gas outlet of an intake gas compressor 27a of the exhaust gas turbine turbocharger 27 (exhaust gas turbine turbocharger). This exhaust gas turbine turbocharger 27 includes the intake gas compressor 27a and an exhaust gas turbine 27b coupled to each other via a rotating shaft 29, so that, as the exhaust gas flow spins the exhaust gas turbine 27b. the intake gas compressor 27a compresses the gas mixture to be supplied to the combustion cylinders of the engine body 7.

Exhaust pipes 31 are connected to the respective cylinder heads 19. The exhaust pipes 31 are each connected to a collective exhaust pipe 33, so that exhaust gas from the collective exhaust pipe 33 is introduced into the exhaust gas turbine 27b of the exhaust gas turbine turbocharger 27, and discharged through an exhaust outlet pipe 35. There is provided an exhaust gas bypass pipe 37 bifurcating at the inlet side of the exhaust gas turbine 27b and connected to the outlet side thereof to bypass the exhaust gas turbine 27b. An exhaust gas bypass valve 39 is provided in the exhaust gas bypass pipe 37, for changing the passage area of the exhaust gas bypass pipe 37.

A mixer 43 is installed between a turbocharger inlet pipe 41 for supplying intake gas mixture to the exhaust gas turbine turbocharger 27 and the air inlet pipe 5. Part of CMM gas, which is the fuel gas supplied from the gas supply pipe 3, is mixed to air, or a mixture of air and VAM gas, from the air inlet pipe 5, in this mixer 43. This intake gas mixture is compressed by the intake gas compressor 27a of the exhaust gas turbine turbocharger 27.

The gas supply pipe 3 bifurcates midway into a turbocharger-side gas supply pipe 45 and a cylinder-side gas supply pipe 47. The turbocharger-side gas supply pipe 45 is connected to the mixer 43, and provided with a gas flowmeter 49, and a mixer-side gas control valve 51 for controlling the amount of gas supplied to the mixer 43. The CMM gas as fuel gas need not necessarily be supplied to the mixer 43 from the gas supply pipe 3 as in this embodiment. However, supplying CMM gas as fuel gas to the mixer 43 from the gas supply pipe 3 allows downsizing of gas control valves 63 for discrete cylinders provided in the gas supply branch pipes 69 to be described later.

The cylinder-side gas supply pipe 47 is connected to the respective intake branch pipes 21 of the cylinders so as to mix the fuel gas further to the gas mixture compressed by the exhaust gas turbine turbocharger 27 and flowing inside the intake branch pipes 21 before it is supplied to the combustion chambers inside the cylinders. The cylinder-side gas supply pipe 47 is provided with a gas flowmeter 53 and a cylinder-side gas control valve 55 for controlling the amount of gas supplied to the cylinders. The gas supply pipe 3 is further provided with a strainer 57 and a fuel demister 59.

A controller 61 is provided, for controlling the degrees of opening of the gas control valves 63 for discrete cylinders provided in the respective gas supply branch pipes 69, and of the mixer-side gas control valve 51 provided in the turbocharger-side gas supply pipe 45, based on engine rpm signals from the rpm sensor 15, to achieve a target rpm.

The controller 61 also controls the degree of opening of the exhaust gas bypass valve 39 to achieve a predetermined air-fuel ratio, based on engine rpm signals from the rpm sensor 15, engine load signals from the load sensor 17, intake gas pressure signals from an intake gas pressure sensor 65, and intake gas temperature signals from an intake gas temperature sensor 67.

During operation of this gas engine 1, fuel gas from the gas supply pipe 3 flows through the strainer 57 and the fuel demister 59 provided in the gas supply pipe 3 so that impurities such as dust and steam much contained in the exhaust from the coal mine are removed. The fuel gas that has passed through the fuel demister 59 is divided midway, and part of the divided fuel gas is introduced into the mixer 43 through the turbocharger-side gas supply pipe 45, where it is mixed with air, or a mixture of air and VAM gas, from the air inlet pipe 5, this gas mixture being then introduced into the intake gas compressor 27a of the exhaust gas turbine turbocharger 27 as intake gas mixture. The intake gas mixture compressed to high temperature and high pressure in the intake gas compressor 27a is cooled down by the intercooler 25, and flows through the intake pipe 23 into the respective intake branch pipes 21 of the cylinders.

The other one of the divided fuel gas flows enters the cylinder-side gas supply pipe 47, and flows into the respective intake branch pipes 21 from the respective gas supply branch pipes 69 of the cylinders, where it is mixed with the intake gas mixture, to be fed into the respective cylinders.

Exhaust gas flows from the respective cylinders of the gas engine 1 travel through the exhaust pipes 31 and join in the collective exhaust pipe 33 to be fed to and spin the exhaust gas turbine 27b of the exhaust gas turbine turbocharger 27, after which it is discharged to the outside through the exhaust outlet pipe 35. The exhaust gas bypass valve 39 is controlled by operation control signals from the controller 61 so that part of the exhaust gas in the collective exhaust pipe 33 bypasses the exhaust gas turbine 27b and exits from the exhaust outlet pipe 35, whereby the flow rate of exhaust gas to be compressed by the exhaust gas turbine turbocharger 27 is controlled.

(Embodiment 1)

A first embodiment of the seal air supply system 71 for the exhaust gas turbine turbocharger 27 in the gas engine 1 having the configuration described above will be explained with reference to FIG. 2.

Figure 2:
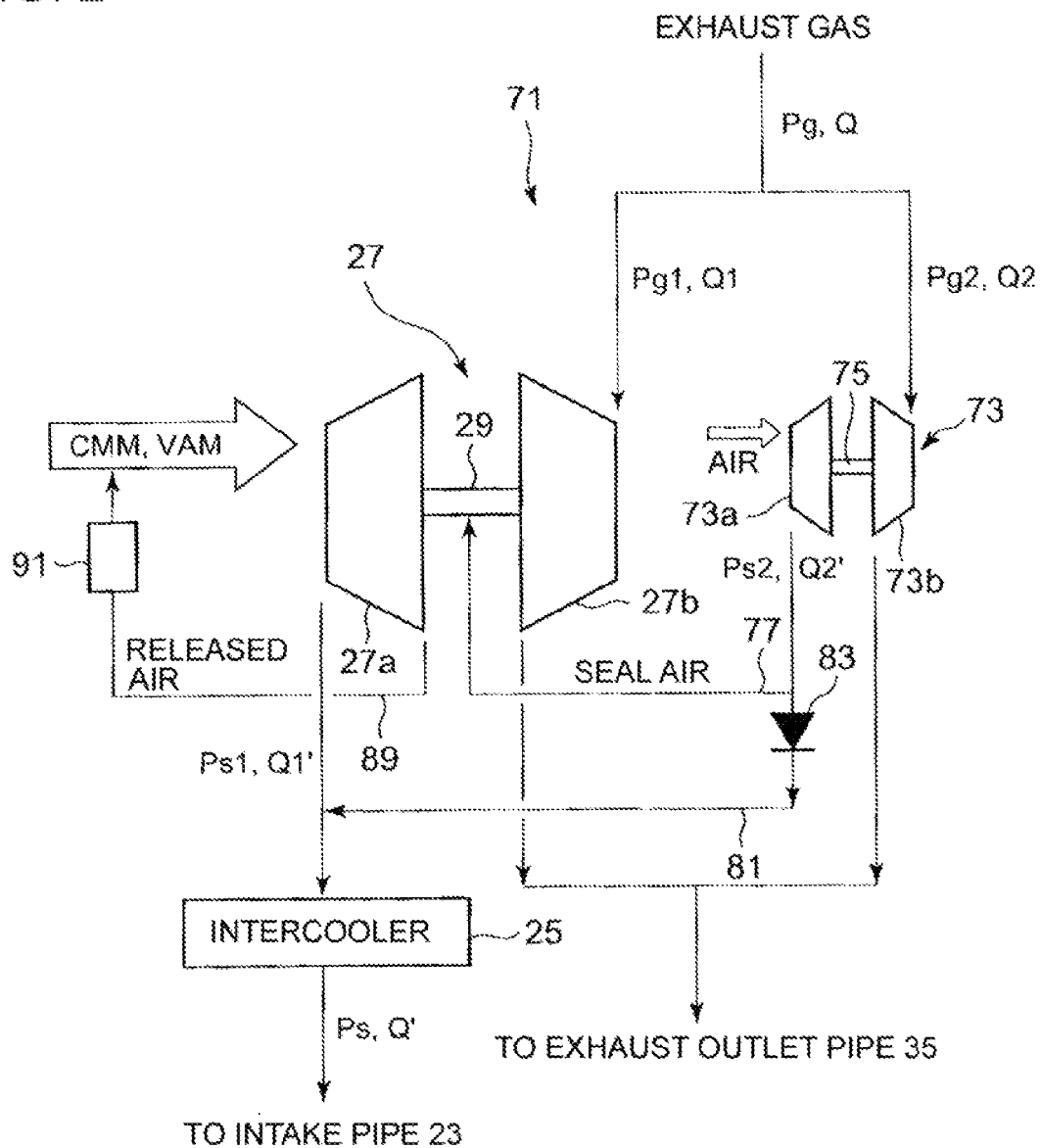
FIG. 2 is a configuration diagram illustrating a first embodiment of the seal air supply system.

FIG. 2 is a configuration diagram of the seal air supply system 71, or a detailed illustration of part A in FIG. 1.

Separately from the exhaust gas turbine turbocharger 27 which is the main turbocharger, a seal air compressor 73 as a sub turbocharger is provided near the exhaust gas turbine turbocharger 27 in parallel arrangement therewith relative to the flow of exhaust gas in the gas engine. This seal air compressor 73 is an exhaust gas turbine compressor, configured with an exhaust gas turbine 73b driven by part of the exhaust gas discharged from the collective exhaust pipe 33, and a compressor 73a coupled to the exhaust gas turbine 73b via a rotating shaft 75. Atmospheric air is drawn into the compressor 73a.

Exhaust gas that has passed through the exhaust gas turbine 73b of the seal air compressor 73 joins the exhaust gas that has passed through the exhaust gas turbine 27b of the exhaust gas turbine turbocharger 27 and is discharged.

Compressed air compressed by the compressor 73a of the seal air compressor 73 is supplied to a seal air supply part 79 (backside space of a turbine disc 99, see FIG. 4) of the exhaust gas turbine turbocharger 27 through a seal air supply passage 77, to be used as seal air of the exhaust gas turbine turbocharger 27. The seal air supply passage 77 bifurcates midway to form a surplus air inlet passage 81 for guiding surplus air of the seal air fed to the seal air supply part 79 toward an outlet side of the intake gas compressor 27a of the exhaust gas turbine turbocharger 27. A check valve 83 that allows air to flow only toward the outlet side of the intake gas compressor 27a is provided in the surplus air inlet passage 81, to prevent a reverse flow from the outlet side of the intake gas compressor 27a.

As the high-pressure intake gas mixture on the outlet side of the intake gas compressor 27a of the exhaust gas turbine turbocharger 27 is stopped from flowing reversely into the surplus air inlet passage 81, a surplus of compressed air generated by the seal air compressor 73 can be directed to the outlet side of the intake gas compressor 27a only when there is a surplus of compressed air in excess of the amount consumed as seal air, and when the pressure is higher than that on the outlet side of the exhaust gas turbine turbocharger 27. Surplus air is thus introduced into the intake gas mixture on the outlet side of the intake gas compressor 27a reliably.

Figure 4:
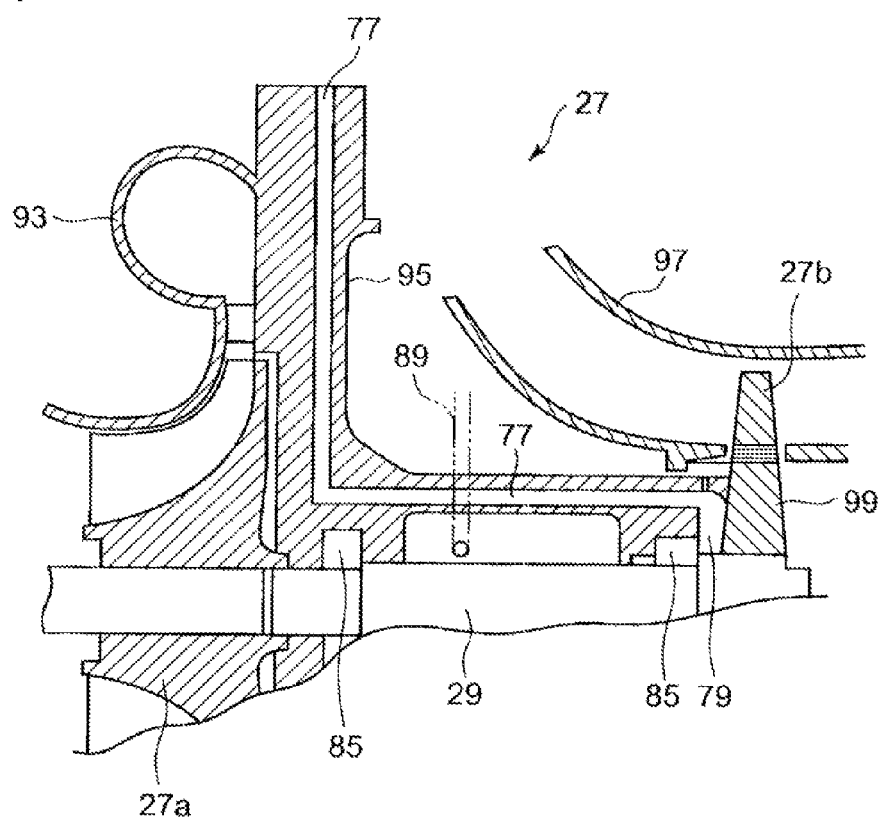
FIG. 4 is a schematic cross-sectional view illustrating a seal air supply passage.
Figure 5:
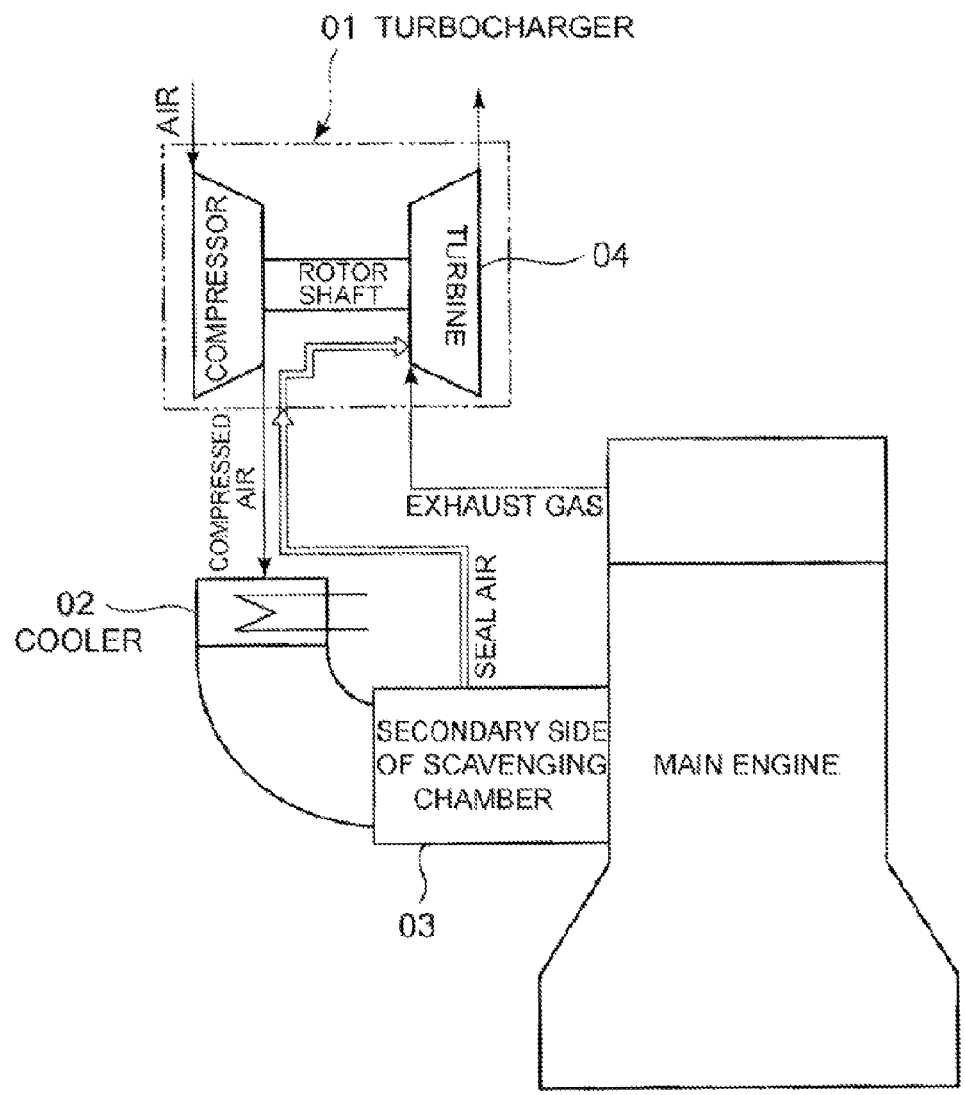
FIG. 5 is an overall configuration diagram illustrating a conventional technique.

Seal air supplied to the seal air supply part 79 then serves its purposes such as cooling and sealing parts of the bearing 85 (see FIG. 4), and is released from a seal air release port 89 (see FIG. 4). The released air is then supplied to the inlet side of the intake gas compressor 27a of the exhaust gas turbine turbocharger 27 through the seal air release passage 89. An oil mist filter 91 is provided in this seal air release passage 89.

Seal air flowing through the seal air supply part 79, the bearing 85, and others prevents ingress of exhaust gas, keeps a good balance of thrust in the exhaust gas turbine 27b. and prevents leakage of lubricating oil. After oil components contained in the seal air have been removed, the seal air flows into the upstream side of the intake gas compressor 27a of the exhaust gas turbine turbocharger 27 as clean air.

FIG. 4 illustrates an outline of the seal air supply part 79, bearing 85 and others of the exhaust gas turbine turbocharger 27. The rotating shaft 29 having the intake gas compressor 27a and the exhaust gas turbine 27b is supported by the bearing 85 and housed inside a compressor casing 93, a bearing base 95, and a turbine casing 97. The seal air supply passage 77 extends radially in the bearing base 95 at the back of the intake gas compressor 27a toward the shaft center for cooling the backside of the intake gas compressor 27a, and further extends along the axial direction in the shaft center part for guiding the seal air to the seal air supply part 79, which is a space at the back of the turbine disc 99 of the exhaust gas turbine 27b. Seal air guided into the seal air supply part 79 balances the thrust from the turbine disc 99, cools the bearing 85 and provides a seal for lubricating oil as it flows through the bearing 85, and is released from the seal air release passage 89.

Now, supposing that the seal air compressor 73 is provided separately from and in parallel with the exhaust gas turbine turbocharger 27 and driven by exhaust gas energy of the gas engine 1, how intake gas is supplied and air seals are formed as required irrespective of any variations in engine load will be explained with reference to FIG. 2.

The energy of exhaust gas from the gas engine 1 is obtained by a product of pressure (Pg) and flow rate (Q) of the exhaust gas. This product Pg×Q is uniquely determined by the engine load. The amount of work the turbocharger is capable of performing by this energy is also uniquely determined by the product of pressure (Ps) and flow rate (Q') on the outlet side of the turbocharger (Ps×Q').

That is, (Ps×Q')/(Pg×Q)=Const., irrespective of the engine load. The sum of the respective amounts of work Pg1'×Q1' and Pg2'×Q2' available from the respective energies Pg1×Q1 and Pg2×Q2, which are products of partial pressures and flow rates of Pg×Q, is equal to Ps×Q'.

Namely, Pg×Q=(Pg1×Q1)+(Pg2×Q2), and Ps×Q'=(Ps1× Q1')+(Ps2×Q2'), meaning that the ratio of work divided between both turbochargers is always constant with respect to the variations in load of the engine 1, so that intake gas and seal air are obtained as desired irrespective of the load.

Thus seal air is always generated in any load conditions automatically as long as the gas engine 1 is running, so that there is no risk that the gas engine 1 continues running even though the supply of seal air has stopped, leading to seal failure, an imbalance of thrust, or cooling failure in, and consequent performance deterioration of, the exhaust gas turbine turbocharger 27, resulting in deterioration of engine performance. Thus reliability of the seal air supply system is improved.

According to the first embodiment described above, compressed air is supplied to the seal air supply part 79 through the seal air supply passage 77 from the seal air compressor 73 provided specifically for generating seal air for the exhaust gas turbine turbocharger 27 of the gas engine 1 that uses methane as fuel gas. As the intake gas mixture containing pre-mixed methane is not used as seal air, there is no danger that the intake gas mixture directly contacts high-temperature parts of the exhaust gas turbine turbocharger 27.

Since it is air that is supplied to the seal air supply part 79, the seal air guided to the seal air supply part 79 does not have a serious greenhouse effect as methane even if released to atmosphere from the seal air release passage 89, after it has served its purposes of balancing the thrust from the turbine disc 99, cooling the bearing 85 and providing a seal for lubricant oil as it passes through the bearing 85. Therefore pollution of air environment is prevented.

Moreover, the system includes a surplus air inlet passage 81, which bifurcates from the seal air supply passage 77 that supplies seal air generated by the seal air compressor 73 to the seal air supply part 79, and guides surplus air of the seal air to an outlet side of the intake gas compressor 27a of the exhaust gas turbine turbocharger 27. Therefore, if there is any surplus of air in excess of the amount consumed as seal air, this surplus is added to the compressed air generated by the exhaust gas turbine turbocharger 27, so that the turbocharger 27 can have higher efficiency.

Should the seal air compressor 73 become unable to supply seal air due to a failure or the like, the controller 61 executes control such that the exhaust gas turbine turbocharger 27 supplies seal air itself as conventionally done, and the mixer-side gas control valve 51 for controlling the amount of gas supplied to the mixer 43 is closed to stop the mixing of CMM gas upstream of the exhaust gas turbine turbocharger 27, so that the gas engine 1 can continue running only by the supply of fuel gas from the gas supply branch pipes 69 to the intake branch pipes 21 of the respective cylinders. Thus, a situation where no seal gas is being supplied is avoided, and the intake gas mixture containing methane is prevented from being supplied to the exhaust gas turbine turbocharger 27, to secure safety, and to enable the engine to continue running temporarily when the seal air supply system is incapable of supplying seal air.

(Embodiment 2)

Next, a second embodiment of the seal air supply system 110 will be described with reference to FIG. 3.

In the second embodiment, an air compressor 114 is provided, which is driven by a drive motor 112 provided separately from the gas engine 1, in place of the seal air compressor 73 of the first embodiment. The compressor may be driven by an engine separately provided from the gas engine 1, instead of the drive motor 112.

Figure 3:
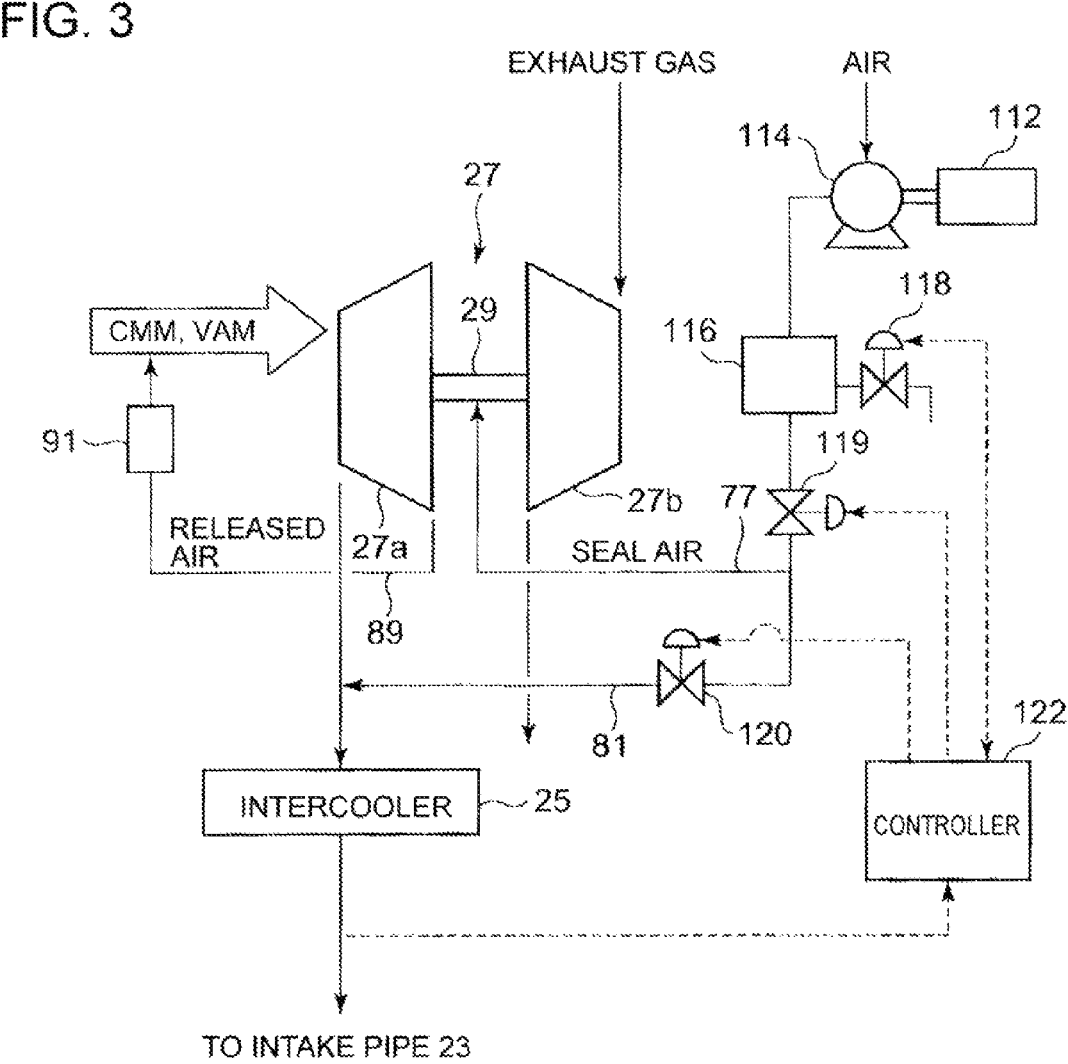
FIG. 3 is a configuration diagram illustrating a second embodiment of the seal air supply system.

The compressed air from the air compressor 114 driven by the drive motor 112 is temporarily stored in a air control tank 116 as shown in FIG. 3. A control valve 118 adjusts the pressure of air in this air control tank 116 to a constant level (which is appropriate for balancing the thrust from the turbine disc 99 of the exhaust gas turbine turbocharger 27, for example), and a seal air flow rate control valve 119 adjusts the flow rate of air as it is fed thereafter through the seal air supply passage 77 to the seal air supply part 79 of the exhaust gas turbine turbocharger 27.

The seal air supply passage 77 bifurcates to form a surplus air inlet passage 81, in which a surplus air flow rate control valve 120 is provided. Opening this surplus air flow rate control valve 120 allows part of seal air to be discharged to the outlet side of the intake gas compressor 27*a* of the exhaust gas turbine turbocharger 27. The surplus air flow rate control valve 120 opens when the pressure of seal air is higher than that on the outlet side of the intake gas compressor 27*a* and when there is a surplus of air in excess of the amount consumed as seal air, so that the surplus of seal air can be introduced into the gas mixture on the outlet side of the intake gas compressor 27*a* of the exhaust gas turbine turbocharger 27. A controller 122 controls the pressure control valve 118 of the air control tank 116, the seal air flow rate control valve 119, and the surplus air flow rate control valve 120 based on the signals indicative of the pressure on the outlet side of the intake gas compressor 27*a* and the pressure in the air control tank 116.

According to the second embodiment, the air compressor 114 is driven by a drive source provided separately from the gas engine 1, so that compressed air it produces can be supplied to the exhaust gas turbine turbocharger 27 as seal air. Therefore the seal air supply system can be installed simply at low cost without the need to change the configuration of the engine body for installation of the seal air compressor, by the use of compressed air generated by an existing external drive source. Other advantageous effects are similar to those of the first embodiment.

INDUSTRIAL APPLICABILITY

According to the present invention, compressed air from a seal air compressor provided separately from the exhaust gas turbine turbocharger is supplied to a seal air supply part of the exhaust gas turbine turbocharger through a seal air supply passage as seal air for the turbocharger of the gas engine. As the intake gas mixture containing pre-mixed methane is not used as seal air, there is no danger that the intake gas mixture directly contacts high-temperature parts of the exhaust gas turbine turbocharger. Moreover, since it is air that is supplied to the seal air supply part, it does not have a serious greenhouse effect as methane even though released to atmosphere after being supplied, so that air pollution is prevented. Therefore the invention is suited as a seal air supply system for an exhaust gas turbine turbocharger in a gas engine that uses methane gas as fuel.

The invention claimed is:

1. A seal air supply system for an exhaust gas turbine turbocharger in a gas engine, in which a mixture of air and part or all of fuel gas pre-mixed upstream of the exhaust gas turbine turbocharger is supplied as intake gas to a combustion chamber through the exhaust gas turbine turbocharger, the seal air supply system comprising:
   a seal air compressor provided separately from the exhaust gas turbine turbocharger;
   a seal air supply passage guiding compressed air generated by the seal air compressor to a seal air supply part of the exhaust gas turbine turbocharger as seal air of the exhaust gas turbine turbocharger;
   a surplus air inlet passage bifurcating from the seal air supply passage and guiding surplus air of the seal air fed to the seal air supply part to a compressor outlet side of the exhaust gas turbine turbocharger; and
   a seal air release passage returning the seal air that has flowed through the seal air supply part to a compressor inlet side of the exhaust gas turbine turbocharger.

2. The seal air supply system according to claim 1, wherein the seal air compressor is an exhaust gas turbine compressor provided in parallel with the exhaust gas turbine turbocharger relative to a flow of exhaust gas in the gas engine and driven by the exhaust gas.

3. The seal air supply system according to claim 1, wherein the seal air compressor is driven by a drive unit provided separately from the gas engine.

4. The seal air supply system according to claim 1, further comprising a check valve provided in the surplus air inlet passage and allowing the seal air to flow only toward the compressor outlet side of the exhaust gas turbine turbocharger.

5. The exhaust gas turbine turbocharger, comprising the seal air supply system according to claim 1.

6. The exhaust gas turbine turbocharger, comprising the seal air supply system according to claim 2.

7. The exhaust gas turbine turbocharger, comprising the seal air supply system according to claim 3.

8. The exhaust gas turbine turbocharger, comprising the seal air supply system according to claim 4.

9. The seal air supply system according to claim 1, further comprising:
   a surplus air flow rate control valve provided in the surplus air inlet passage,
   wherein the surplus air flow rate control valve is configured to open when pressure of the seal air is higher than pressure on the compressor outlet side of the exhaust gas turbine turbocharger and when there is a surplus of air in excess of the amount consumed as the seal air so as to allow the surplus of the seal air to be introduced to the compressor outlet side of the exhaust gas turbine turbocharger.

* * * * *